United States Patent [19]
Frater et al.

[11] Patent Number: 5,742,996
[45] Date of Patent: Apr. 28, 1998

[54] METHOD OF MANUFACTURING A TRANSDUCER SUSPENSION SYSTEM

[75] Inventors: Norman Kermit Frater, San Jose, Calif.; David Gerson, Chapel Hill, N.C.; Gary L. Heitkamp, Plymouth, Minn.; Thomas Mark Hoffmann, Santa Cruz, Calif.; John Philip Hollowell, Fremont, Calif.; Peter William Kanas, San Jose, Calif.; Oscar Jaime Ruiz, San Jose, Calif.; Enrique Eduardo Sanicky, San Jose, Calif.

[73] Assignee: International Business Machines Corporation, Armonk, N.Y.

[21] Appl. No.: 582,288

[22] Filed: Jan. 3, 1996

[51] Int. Cl.$^6$ ............................ G11B 5/48; G11B 21/16
[52] U.S. Cl. .......................... 29/603.06; 29/603.03; 29/603.07; 360/104
[58] Field of Search .................. 29/603.03, 603.04, 29/603.06, 603.07, 603.01, 33 M; 360/103, 104

[56] References Cited

U.S. PATENT DOCUMENTS

| | | | |
|---|---|---|---|
| 3,177,495 | 4/1965 | Felts | 29/603.06 X |
| 3,665,434 | 5/1972 | Applequist et al. | 360/103 |
| 4,517,718 | 5/1985 | Johnson, Jr. | 29/33 M |
| 4,520,555 | 6/1985 | Gyi et al. | 29/603.06 |
| 4,761,699 | 8/1988 | Ainslie et al. | 360/104 X |
| 4,854,036 | 8/1989 | DiGregorio | 29/603.06 X |
| 5,074,029 | 12/1991 | Brooks Jr. et al. | 29/603.03 |
| 5,249,092 | 9/1993 | Russell-Smith et al. | 360/104 |
| 5,282,103 | 1/1994 | Hatch et al. | 360/104 |
| 5,327,310 | 7/1994 | Bischoff et al. | 360/103 |
| 5,331,489 | 7/1994 | Johnson et al. | 360/104 |
| 5,353,181 | 10/1994 | Frater et al. | 360/104 |
| 5,392,179 | 2/1995 | Sendoda | 360/104 |
| 5,465,186 | 11/1995 | Bajorek et al. | 29/603.07 X |
| 5,623,758 | 4/1997 | Brooks, Jr. et al. | 29/603.01 |

FOREIGN PATENT DOCUMENTS

| | | | |
|---|---|---|---|
| 4-146516 | 5/1992 | Japan | 360/103 |
| 6-68445 | 3/1994 | Japan | 360/103 |
| 6-124558 | 5/1994 | Japan | 360/103 |

OTHER PUBLICATIONS

IBM Technical Disclosure Bulletin vol. 37, No. 8 "Low Profile Wire Loop" Aug. 1994.

*Primary Examiner*—Peter Vo
*Attorney, Agent, or Firm*—Douglas R. Millett; Noreen A. Krall

[57] ABSTRACT

A method of manufacturing a transducer suspension system for a data storage disk drive device having electrical wires strung along the top surface of the suspension, by bending the wires around the distal end of the suspension and connecting the wires to electrical pads on the transducer slider below. The height of the wires is reduced by swiping the wires in a lateral direction using a two-finger member. The swipe operation bends the wires down to reduce the overall height and reduces the stress created by the wires in the electrical pad bonds and allows the slider gimbal the freedom to move.

9 Claims, 10 Drawing Sheets

METHOD OF MANUFACTURING A TRANSDUCER SUSPENSION SYSTEM

BACKGROUND OF THE INVENTION

1. Field of the Invention

This invention relates generally to transducer suspension systems and more particularly to a wiring system for a low profile transducer suspension.

2. Description of the Prior Art

Direct access storage devices (DASD), or disk drives, store information on concentric tracks of rotatable magnetic recording disks. A magnetic head or transducer element is moved from track to track to record and read the desired information. Typically, the magnetic head is positioned on an air bearing slider which flies above the surface of the rotating disk. In some recently proposed disk drives, the slider rides on a liquid film or bearing on the disk. A suspension assembly connects the slider to a rotary or linear actuator. The suspension provides support for the slider.

Examples of transducer suspensions are given in the following references: U.S. Pat. No. 3,665,434, issued May 23, 1972, to Applequist et al; U.S. Pat. No. 5,074,029, issued Dec. 24, 1991, to Brooks Jr. et al; U.S. Pat. No. 5,249,092, issued Sep. 28, 1993, to Russell-Smith et al; U.S. Pat. No. 5,282,103, issued Jan. 25, 1994, to Hatch et al; U.S. Pat. No. 5,327,310, issued Jul. 5, 1994, to Bischoff et al; U.S. Pat. No. 5,331,489, issued Jul. 19, 1994, to Johnson et al; U.S. Pat. No. 5,353,181, issued Oct. 4, 1994, to Frater et al; U.S. Pat. No. 5,392,179, issued Feb. 21, 1995, to Sendoda; Japanese Patent Application 2-270872, published Oct. 8, 1990, to Fuchigami; Japanese Patent Application 4-220548, published Aug. 20, 1992, to Otsuka; Japanese Patent Application 4-272635, published Oct. 12, 1992, to Kodaira; and IBM Technical Disclosure Bulletin Vol. 37, No. 8, August 1994, page 427.

Electrical wiring must be run along the suspension from the electrical circuitry of the disk drive to the transducer element on the slider. One common way to do this is to run the wires in an insulating tube which is attached to the side of the suspension. At the end of the suspension, the wires exit the insolation tube and are electrically connected to the transducer pads on the slider. A problem with this design is that it requires that the wiring be manually assembled. This is very time consuming and requires a significant amount of labor cost.

Another method to assembling the wire for a suspension is shown in U.S. Pat. No. 5,074,029. This patent teaches a method for automated wire stringing of the wires along the suspension.

Electrical wires are strung along the top of the suspension and are bent around the end of the suspension for attachment to the transducer element located on the side of the slider. One problem has been that this bend causes the wire height at that location to increase. In disk drives having multiple disks, there is a limited amount of space between the disks and any increase in wire height is undesirable. Also, small disk drives having a single disk, such as PCMCIA drives also have limited amounts of height and additional space taken up by suspension wiring is undesirable.

One method used to solve this problem is to run a member along the wiring in a direction parallel to the longitudinal direction of the wires. This presses the wires down and forward along the suspension so that they bunch up at the end of the suspension at a location over the slider. Although the height of the wiring is somewhat reduced, the bunching of the wires at the end still causes the wires to have a significant height. In addition, the bunching also causes large stresses to be concentrated at the wire bonding sights. These stresses can cause the wires to detach from their electrical connections, thus causing the disk drive to fail.

In both the manual and automated wire stringing processes, the wires must be bent at the end of the suspension in order to attach to the slider below. This causes the wire height to increase at that location. The increase in wire height is undesirable.

What is needed, is a suspension design and method of assembly which reduces the wire height on the suspension and does not impart large stresses to the electrical connection and also allows the slider gimbal the freedom to move.

SUMMARY OF THE INVENTION

Briefly, in a preferred embodiment of the present invention, a suspension system comprises a load beam having a gimbaled transducer slider attached. Wires are individually strung along the longitudinal direction of the load beam, bending around the edge of the load beam and bonding to the electrical pads on the side of the slider.

A two-finger flexible member is then run across the load beam in a lateral direction. The wires are forced down and sideways and the wires are bent in a first direction and a second direction. The two bends are in opposite directions and act to absorb unwanted forces in the wire. This wire configuration exerts very little stress force on the electrical bonding pads and does not effect the slider flying orientation. The end result is a suspension system having a reduced profile height.

For a fuller understanding of the nature and advantages of the present invention, reference should be made to the following detailed description taken in conjunction with the accompanying drawings.

DESCRIPTION OF THE PREFERRED EMBODIMENTS

Figure 1:
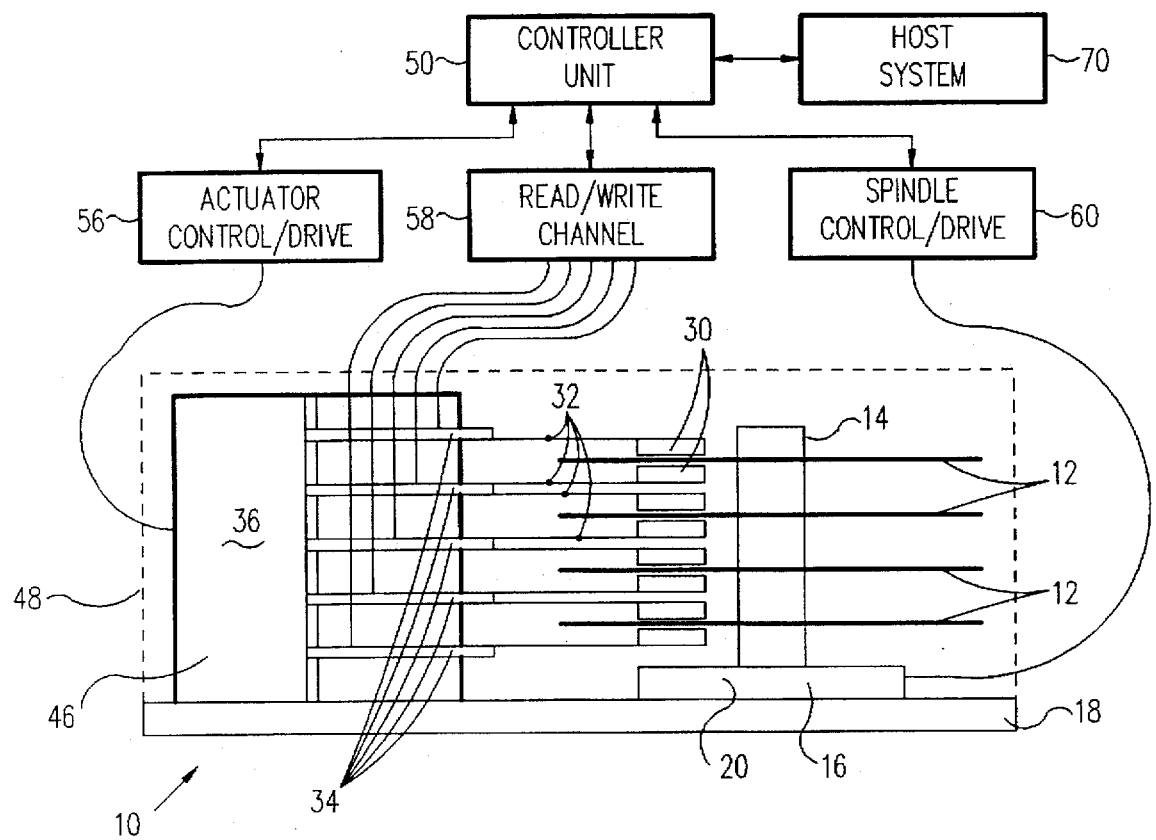
FIG. 1 is a schematic diagram of a data storage system of the present invention.

FIG. 1 shows a schematic diagram of a data storage system of the present invention and is designated by the general reference number 10. System 10 comprises a plurality of magnetic recording disks 12. Each disk 12 has a plurality of concentric data tracks. Disks 12 are mounted on a spindle shaft 14 which is connected to a spindle motor 16. Motor 16 is mounted to a chassis 18. The disks 12, spindle 14 and motor 16 comprise a disk stack assembly 20.

A plurality of sliders 30 having read/write heads are positioned over disks 12 such that each surface of the disks 12 have a corresponding slider 30. Each slider 30 is attached to one of the plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the sliders 30 in a radial direction across disks 12. Actuator 36 typically comprises a rotating member 38 mounted to a rotating bearing 40, a motor winding 42 and motor magnets 44. Actuator 36 is also mounted to chassis 18. The sliders 30, suspensions 32, arms 34 and actuator 36 comprise an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of sliders 30 over disks 12. Controller 50 is connected to a read/write channel 58 which in turn in connected to the read/write heads on the sliders 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically computer system, is connected to the controller unit 50. System 70 may send digital data to controller 50 to be stored on disks 12, or may request that digital data be read from the disks 12 and sent to the system 70. The basic operation of DASD units is well known in the art and is described in more detail in *Magnetic Recording Handbook*, C. Dennis Mee and Eric D. Daniel, McGraw Hill Book Company, 1990.

Figure 2:
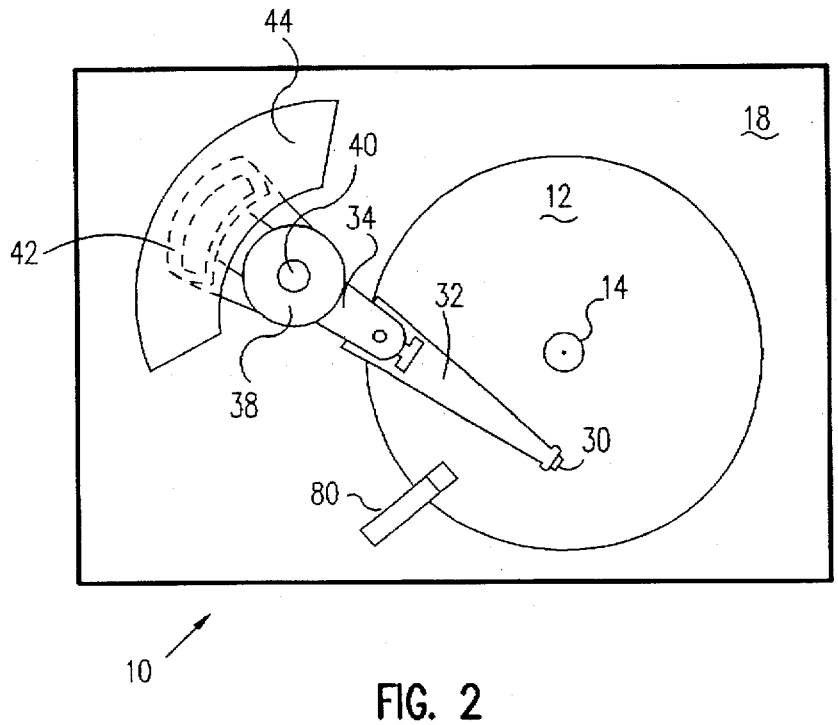
FIG. 2 is a top view of the system of FIG. 1.

FIG. 2 shows a top view of system 10. A loading ramp member 80 is located at the edge of the disk stack assembly 20. Member 80 automatically unloads the sliders 30 from the disks 12 as actuator 36 moves the sliders 30 to the outer disk position. The ramp 80 is optional. Alternatively, the sliders 30 may be place permanently in the loaded position between the disks.

Figure 3:
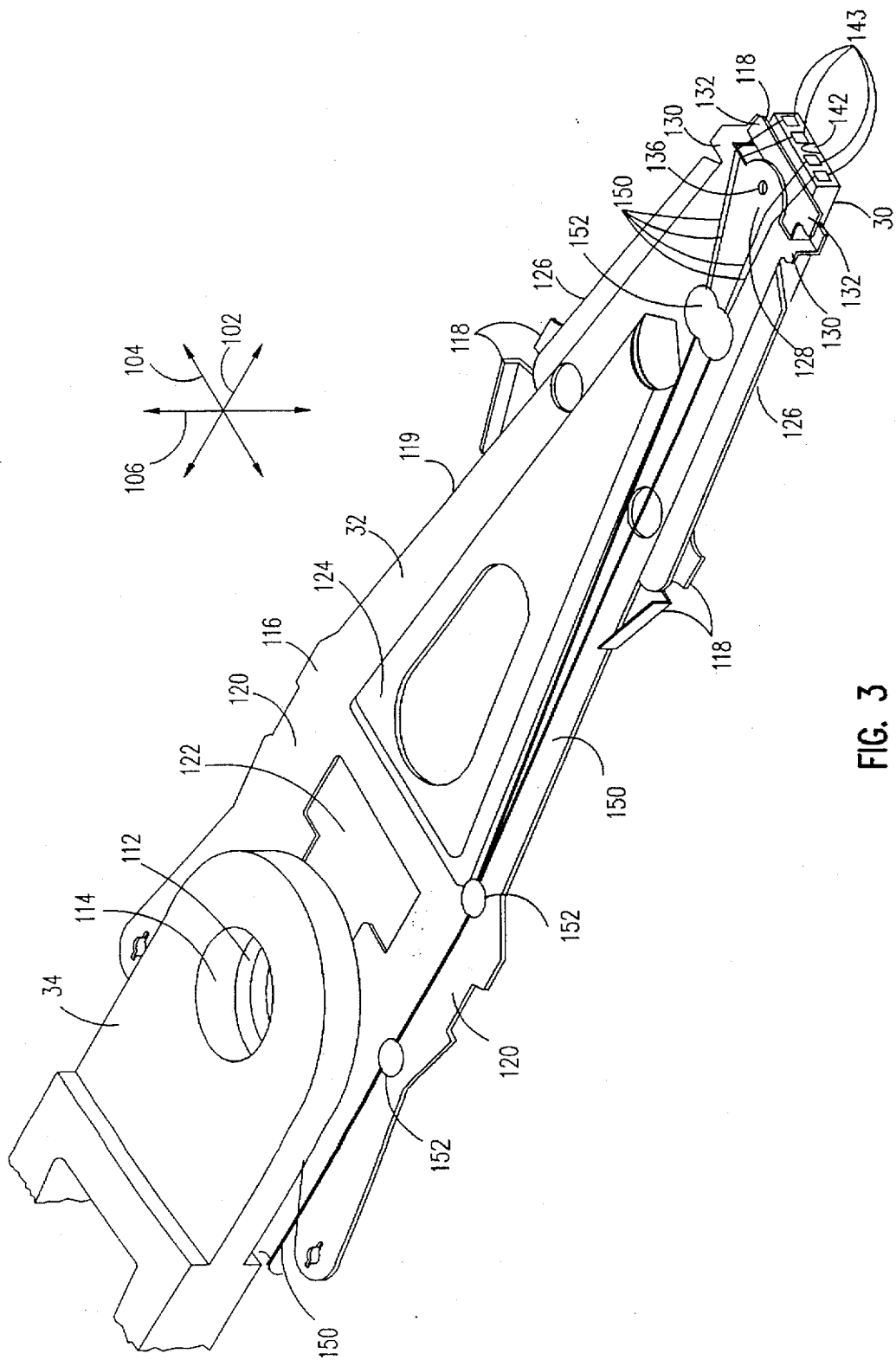
FIG. 3 is a perspective view of the transducer suspension system of the present invention.

FIG. 3 shows a perspective view of the suspension 32. Suspension 32 has a longitudinal axis 102, lateral axis 104 and a vertical axis 106. Suspension 32 is attached to arm 34 by a swaging process. The swage rivet 112 fits into a swage hole 114 of arm 34. The suspension 32 comprises a load beam member 116 and a flexure member 118. The load beam member is made of a sheet of stainless steel which is in the range of 0.038 mm to 0.076 mm (preferably 0.0635 mm) thick and the flexure member is made of a sheet of stainless steel in the range of 0.020 mm to 0.038 mm (preferably 0.0305 mm) thick. Both pieces are formed by a photolithographic etching process and then features are stamped into each member. The load beam 116 and flexure 118 together form a weldment 119.

The load beam 116 has a spring section 120 formed along a spring section hole 122. The spring section 120 is slightly bent to load the slider 30 onto the disk. In other words, the spring section allows the slider to be precisely positioned at its desired flying height above the rotating disk.

The load beam member 116 has a stamped raised section 124 in its middle section which runs in a direction parallel to the longitudinal axis. The load beam member 116 also has a pair of flanges 126 which run along either side edge of the load beam 116. The raised section 124 and flanges 126 give the load beam 116 increased stiffness and rigidity.

A distal end 128 of the load beam 116 has a pair of tabs 130 which bend below tabs 132 of flexure 118. These tabs 130 and 132 limit the vertical deflection axis 106 of flexure 118 and thereby prevent damaging deformation from occurring when the drive is jolted. The distal end 128 also has a stamped downward extending dimple 136 which engages the flexure 118.

The slider 30 has four electrical bonding pads 140 which are electrically connected to a transducer device 142. The pads 140 and transducer 142 are both located on the front side of the slider 30.

A bundle containing a plurality of wires 150 (four in the preferred embodiment) are strung along the load beam 116 in a substantially longitudinal direction (axis 102), passing over flexure 118, and bending down to slider 30. The wires 150 are bonded to the pads 140 on slider 30. The wires 150 are attached to the load beam 116 using drops of glue (glue dots) 152 which are cured using ultraviolet light. The wires 150 have a copper core and gold plating and are in the range of 0.025 mm to 0.050 mm in diameter (preferably 0.0356 mm). The wires have an outer insulating layer of polyurethane in the range of 0.00533 mm±0.0012 thick.

Figure 4:
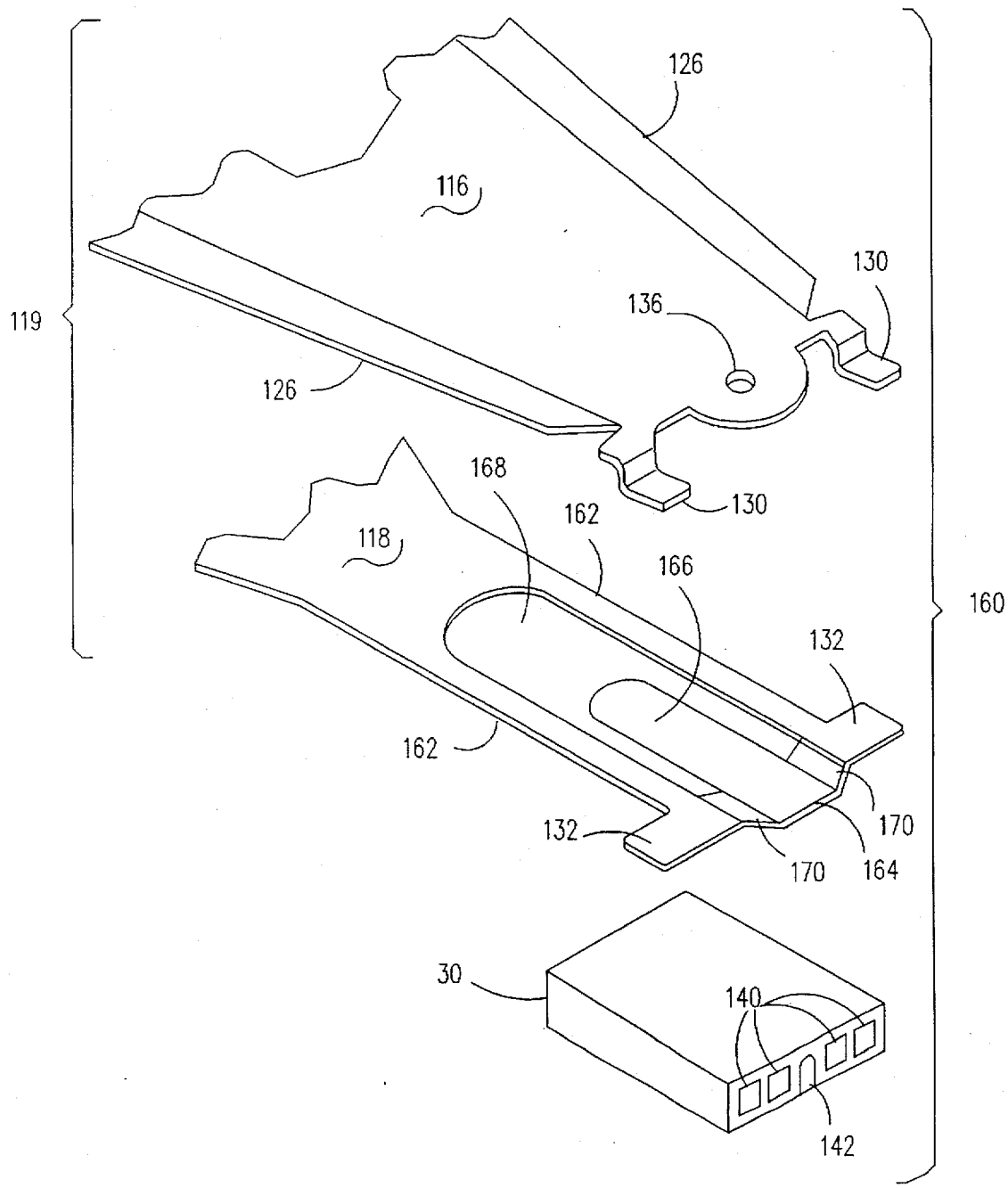
FIG. 4 is an exploded view of a portion of the system of FIG. 3.

FIG. 4 shows a n exploded view of load beam 116, flexure 118, and slider 30 which together form a head gimbal assembly (HGA) 160. The flexure 118 has a pair of leg members 162 which extend outward to an end section 164. End section 164 has a tongue section 166 which extends into a hole 168 formed between legs 162. The tongue section 166 is stamped at bend sections 170 such that it is at a lower elevation than the surrounding flexure 118. When the flexure 118 is welded to beam 116, the dimple 136 engages the tongue section 166.

The slider 30 is attached to the bottom side of the tongue section 166 using an epoxy or other bonding process. The slider 30 is then able to pitch and roll about dimple 136 such that the slider 30 may adjust to its correct flying orientation.

Figure 5:
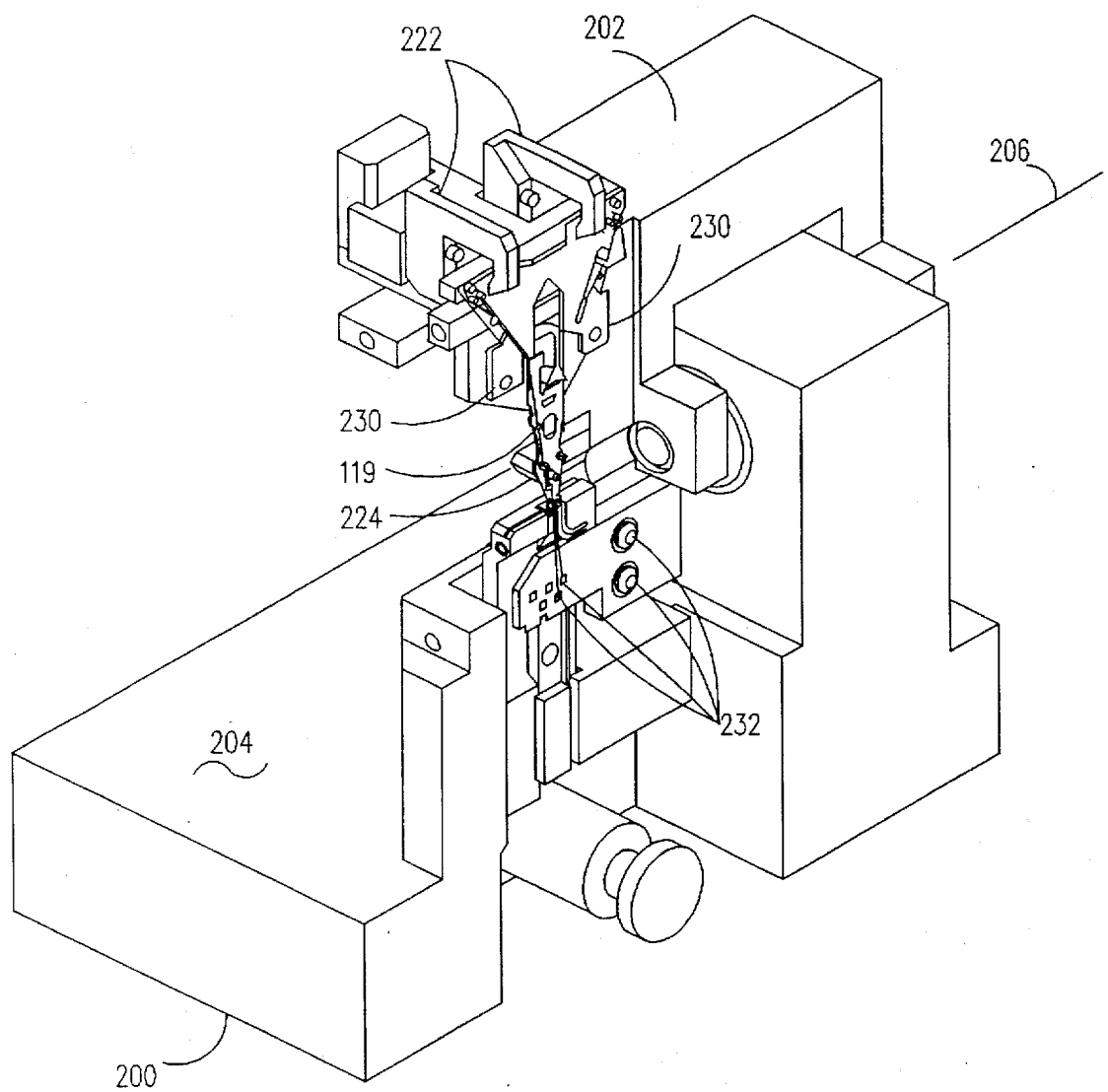
FIG. 5 is a perspective view of a manufacturing device used to make the suspension system of the present invention.

FIG. 5 is a perspective view of a tool block 200. The tool block 200 comprises a holder member 202 which is pivotally attached to a base member 204 at a pivot axis 206. Tooling block 200 is used to hold weldment 119 during the manufacturing process. Weldment 119 is held in place by releasable clamps 222 and alignment pin 224 of holder member 202.

The weldment 119 has a plastic wiring tail 230 attached to its rear section. The wiring tail 230 is used in conjunction with a plurality of wiring pins 232 on the tool block 200 in order to string the wires along the weldment 119. A more detailed description of the wire stringing process is given in U.S. Pat. No. 5,074,029 which is assigned to the assignee of the present invention and is hereby incorporated by reference.

Once the wires are strung, they are glued to the weldment 119 by depositing glue dots at various locations along the length of the wires and then curing the glue using an ultraviolet light.

Figure 6:
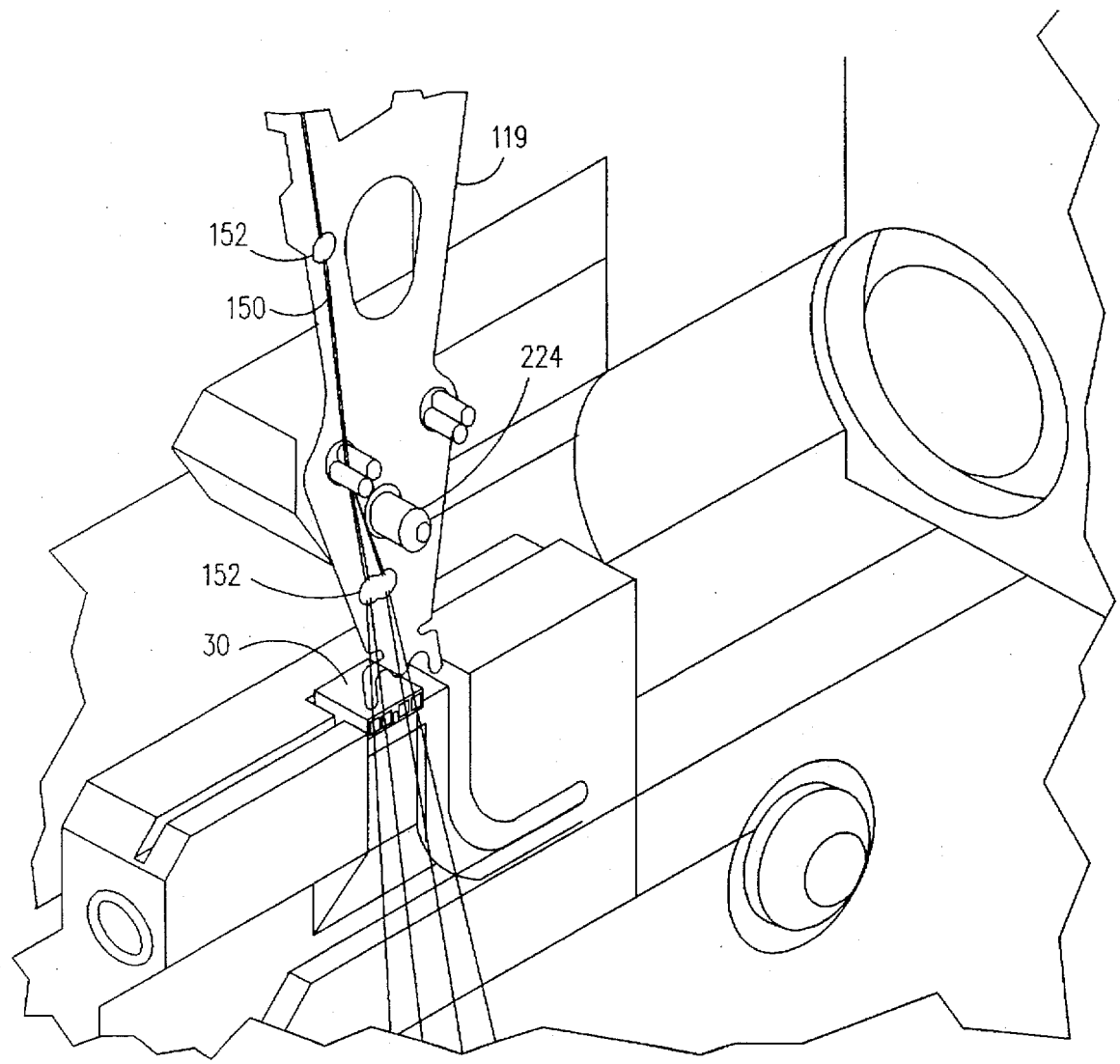
FIG. 6 is a close-up perspective view of a portion of FIG. 5.

FIG. 6 shows a close-up view of FIG. 5. The weldment 119 is held in place vertically above a horizontally oriented slider 30. The wires 150 are held in place such that each wire passes over a respective one of the slider pads 140 to which it will be attached. The insulation on the wires 150 is striped off by directing an eximer laser beam at each of the pads 140. This burns off the insulation on the wires 150 at the location of the pads 140. Next, the individual wires 150 are bonded to their respective pads by ultrasonic bonding. The unneeded extra portion of the wires 150 which extends downward beyond the slider 30 are then cut away or broken off.

Figure 7:
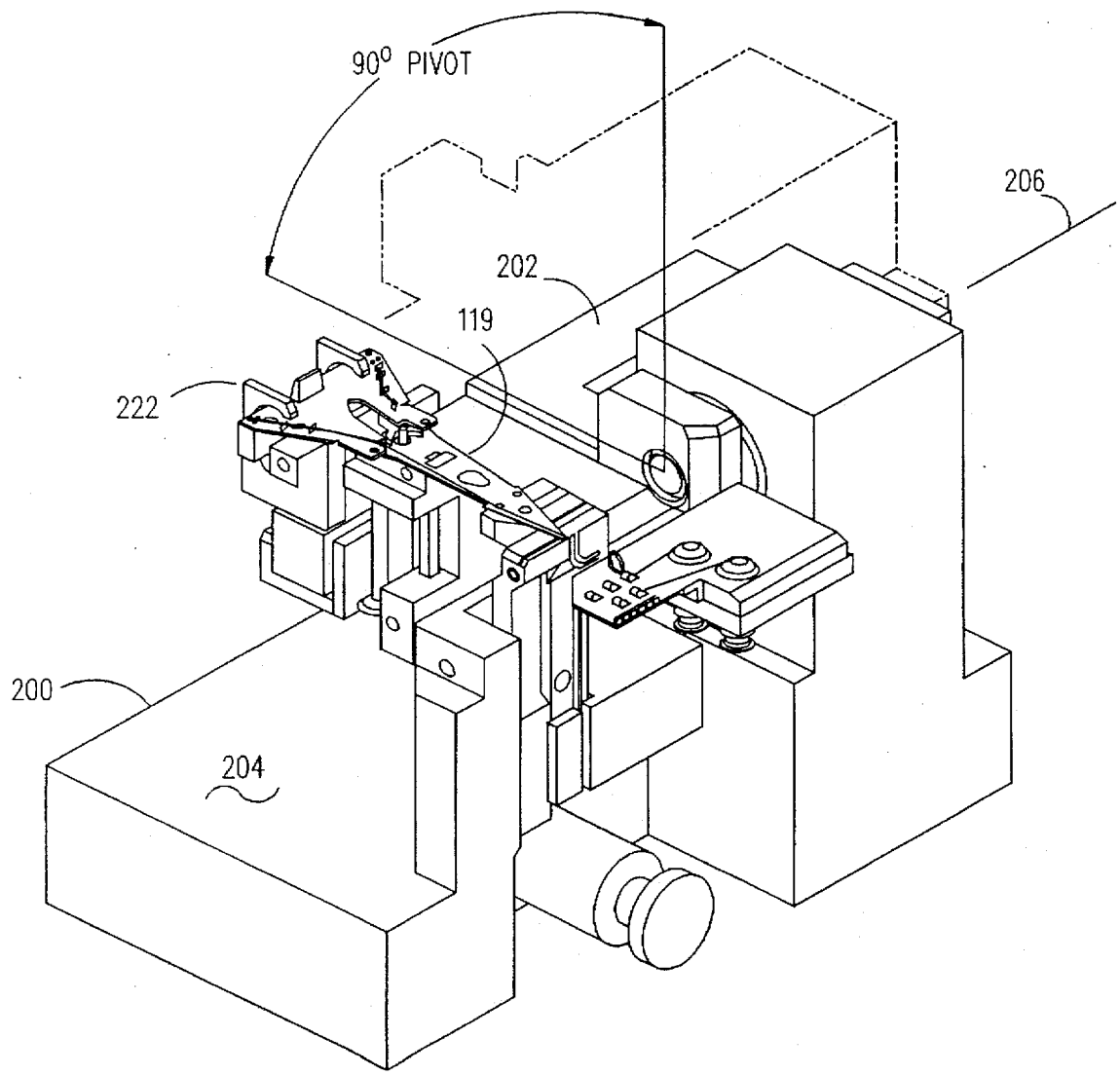
FIG. 7 is a perspective view of a manufacturing device used to make the suspension system of the present invention.

FIG. 7 shows a perspective view of tool block 200 after pivoting. A drop of epoxy is placed on top of slider 30. The holder 202 is then rotated 90° downward relative to the base member 204. This brings the bottom side of tongue section 166 of flexure 118 into contact with the top side of slider 30 which has the epoxy. The two elements are then bonded together. At the same time, the wires 150 are bent at a 90° angle.

Figure 8:
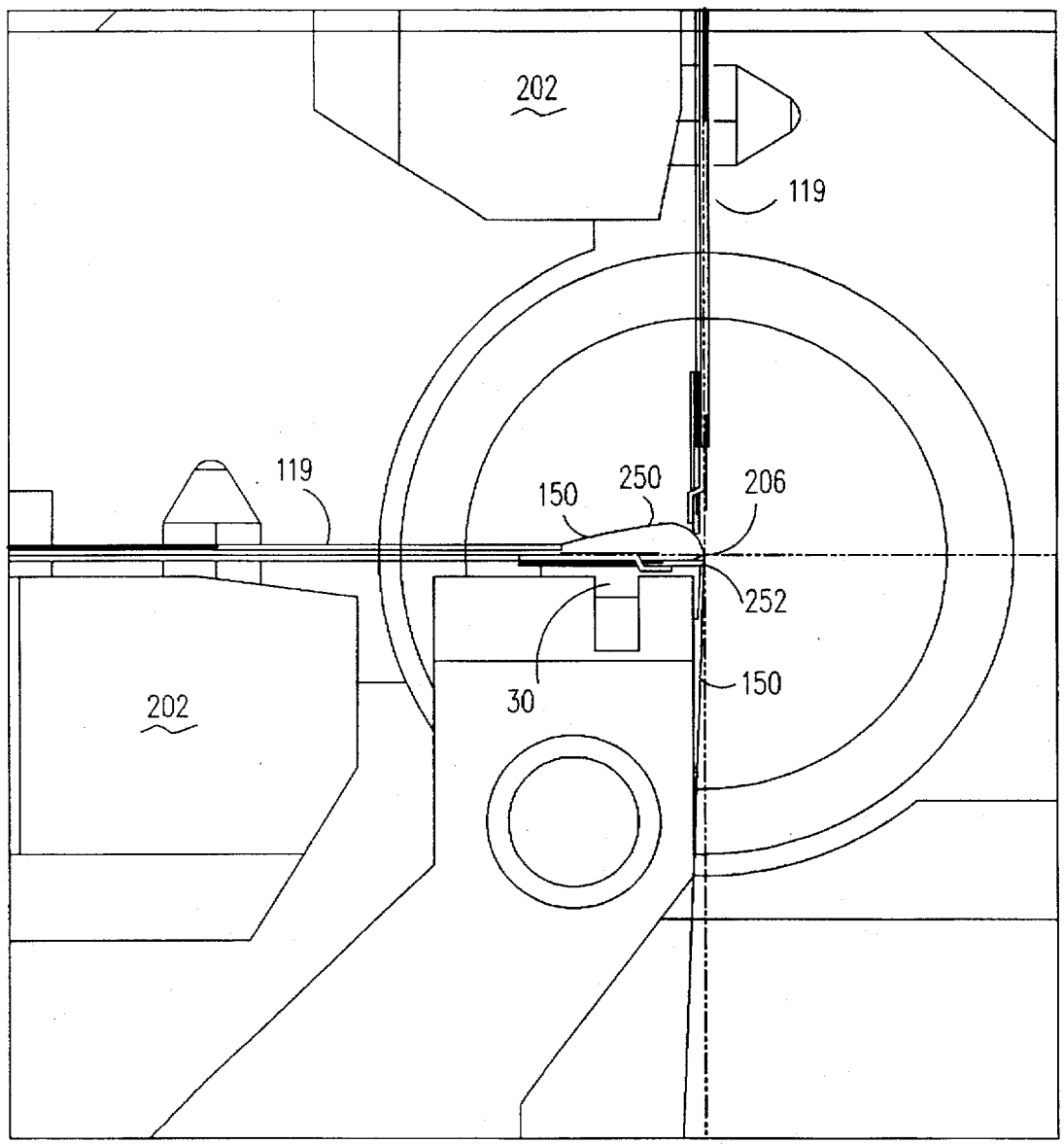
FIG. 8 is a close-up side view of a portion of FIG. 7.

FIG. 8 shows a side view of a portion of FIG. 7 which shows the holder member 202 and weldment 119 in positions both before and after the 90° rotation. The wires 150 have a bend section 250 which has a relatively large height profile. The ultrasonic bonds 252 on slider 30 are visible.

The bend section 250 is necessary because it provides the wires 150 with sufficient excess length (slack) to enable the slider to pitch and roll during operation to maintain its proper flying orientation. This slack is also necessary to reduce the stress on the bonds 252. The amount of slack may be adjusted by changing the positioning of the ends of the weldment 119 and slider 30 relative to the rotation axis 206.

Figure 9:
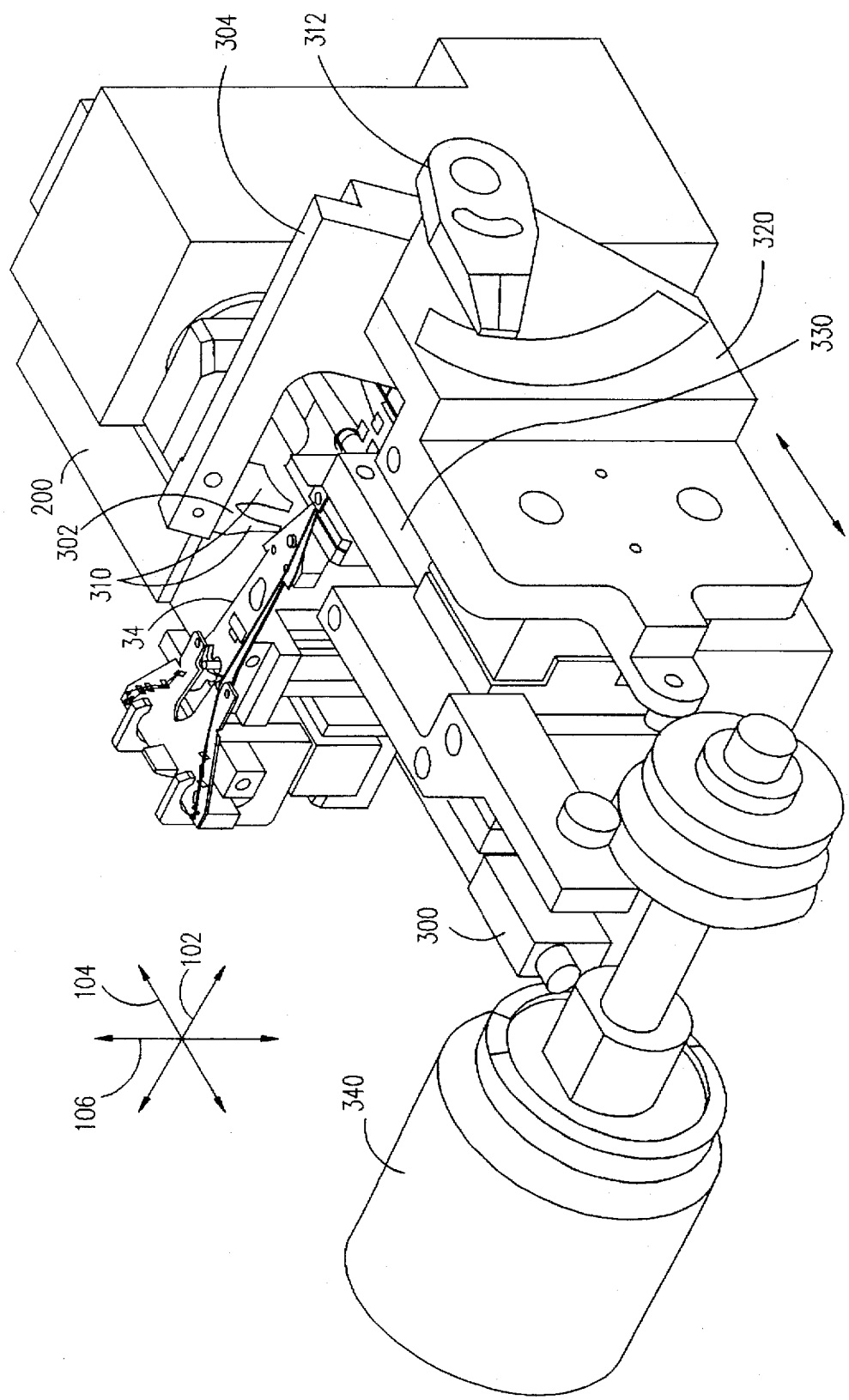
FIG. 9 is a perspective view of a manufacturing device used to make the suspension system of the present invention.

FIG. 9 shows a perspective view of a device used to dress the wires in the present invention. The tool block 200 with suspension 34 is positioned next to a wire dress machine 300. Machine 300 has a wire dress swipe member 302 which is attached to a swipe arm 304. The swipe member 302 is shaped to have two finger members 310 which engage the top surface of suspension 34 and wires 150. The swipe member 302 is made of a flexible material such as plastic or thin metal which is in the range of 0.1 mm to 0.3 mm (preferably 0.25 mm) thick for plastic and in the range of 0.025 mm to 0.10 mm (preferably 0.05 mm) thick for metal. Arm 304 is connected via an adjustable mount 312 to a slide member 320. The adjustable mount 312 allows swipe member 310 to be oriented at an angle relative to a plane which is parallel to the plane containing the vertical axis 106 and longitudinal axis 102.

A blocking member 330 slides in front of slider 30 and covers pads 140. The blocking member 330 keeps the slider in place during the swipe wire dress process. An electrical motor 340 controls the motion of swipe arm 304 and blocking member 330.

During operation, the tool block 200 with suspension 32 is positioned beneath swipe member 302. The motor 340 moves blocking member 330 into a position in front of slider 30 and engages pads 140. The motor 340 also moves slider member 320, swipe arm 304 and swipe member 302 in a lateral linear direction (axis 104) across suspension 32. During this motion, swipe member 302 engages suspension 32 and bends wires 150. After the swipe operation, the swipe member 302 is lifted back over the suspension 32 in a generally semicircular path in order not to engage the suspension 32. The motor 340 accomplishes this motion with a combination of cam members. The blocking member 330 is then retracted.

Figure 10:
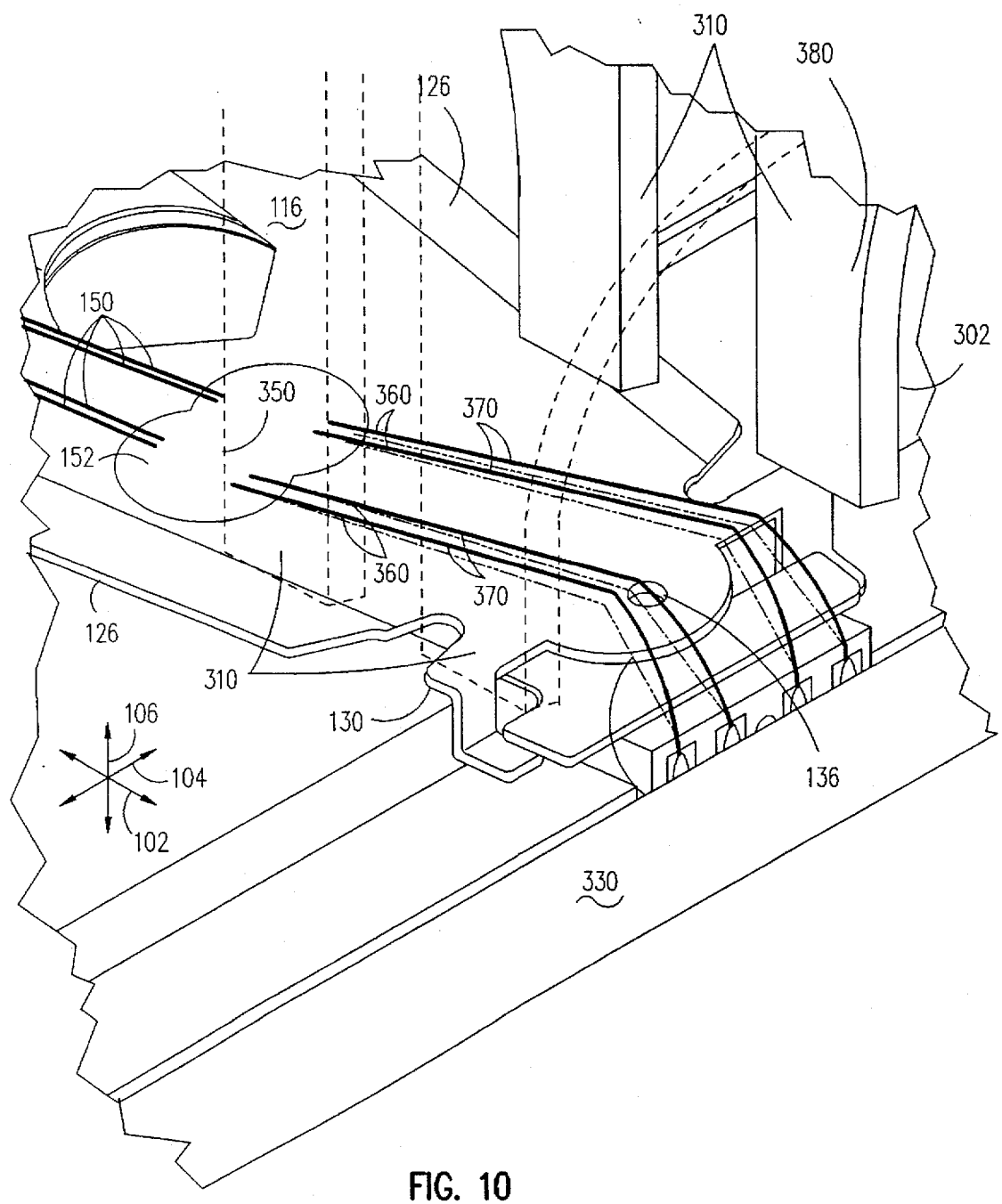
FIG. 10 is a close-up view of a portion of FIG. 9.

FIG. 10 shows a detailed view of a portion of FIG. 9. The swipe member 302 is shown in a first position 350 in dashed line. The two fingers 310 initially extend slightly past the top surface of the load beam 116. The swipe member is set at an offset angle relative to the plane containing the vertical axis 106 and the longitudinal axis 102. This setting is controlled by the adjustable mount 312. This offset angle is in the range of between 5° and 85° and is preferably 20°. As the swipe member moves in a direction parallel to the lateral axis 104, it engages the edge of load beam 116 and rides over the top surface. The rear most finger 310 rides up and over both flanges 126 during the swipe motion. This rear most finger 310 is positioned such that its line of motion passes proximate to the glue dot 152. This glue dot is the final attachment point between the wires 150 and the load beam 116. The next attachment point for the wires 150 is at the slider pads 140. There are no attachment points between this final glue dot 152 and the pads 140, so the wires 150 are free to move. The forward most finger 310 engages load beam 116 at a point proximate tab 130 and passes over dimple 136. The wires 150 are shown in dashed line 360 to show their position prior to the swipe operation.

As the swipe member 302 passes laterally across the suspension it engages wires 150 at each finger 310. The member 302 forces the wires 150 sideways in a lateral direction and downward against the top surface of the load beam 116. The result is that the wires 150 have two bend sections formed in them. The wires are shown in solid line 370 at the position after the swipe operation. The swipe member 302 is shown in a solid line at a position 380 after completion of the lateral swipe motion. The member 302 is then lifted back over the suspension 32 without engaging wires 150 until it is in a position at its starting location for the next suspension.

Figure 11:
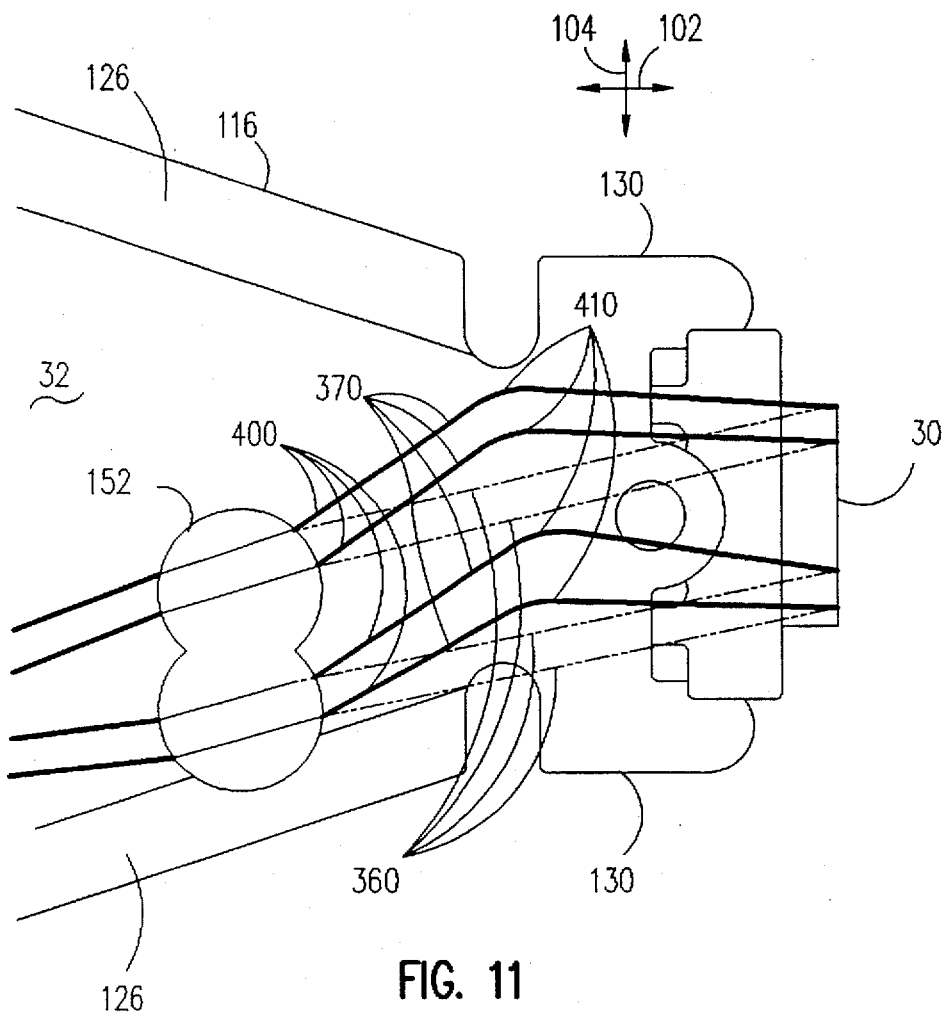
FIG. 11 is a top view of a portion of the suspension system of the present invention.
Figure 12:
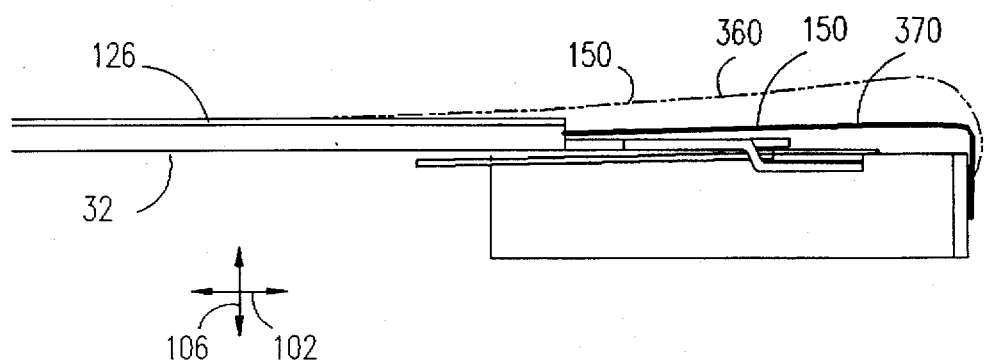
FIG. 12 is a side view of the suspension of FIG. 11.

FIGS. 11 and 12 show a top and side view, respectively, of the suspension 32 after the swipe operation. FIG. 11 shows that after the swipe operation the wires 150 are in position 370. The wires have two bend section 400 and 410. Both bend sections 400 and 410 lie in a plane substantially parallel to a plane containing the longitudinal axis 102 and the lateral axis 104. The bends 400 have a curvature toward a first side of the load beam 116 and the bends 410 have a curvature toward a second side of beam 116. The bends 400 and 410 are thus curved in opposite directions relative to one another.

The present invention reduces the amount of forces exerted on the slider by the wires. The excess slack (bend geometry) is required in order to allow the slider to pitch and roll by transforming relatively high internal compression and tension wire forces to a low force spring displacement.

In the present invention, the first bend at (near) the glue dot releases (removes) a separation force (flexure contacting the dimple) created by the downward yielding force of the wires during the swipe forming process to locate the wires close to the load beam surface.

During the present invention process, the wires are bent past their material yield point at the two bend sections. This causes the wire to remain in its bent position therefore creating the required geometry. The excess slack from the second larger wire bend absorbs linear internal compression and tension forces by transforming them to a low force spring displacement as the slider pitches and rolls during operation. The wires are now free to move slightly back and forth because the bend section (curve) will be able to increase and decrease the wire bend shape with less force, therefore accommodating the slider motion. The larger bend section thereby acts as a relatively low force spring.

FIG. 12 shows a side view of the suspension 32. The wires 150 are shown in position 370 after the swipe operation. It can be seen that the height is greatly reduced relative to their position 360 before the swipe operation. This gives the suspension 32 a greatly reduced height profile. The wires 150 at position 360 are located proximate to the top surface of the load beam 116.

While the preferred embodiments of the present invention have been illustrated in detail it should be apparent that modifications and adaptations to those embodiments may occur to one skilled in the art without departing from the scope of the present invention as set forth in the following claims.

What is claimed is:

1. A method of manufacturing a transducer suspension system comprising the steps of:

attaching a plurality of wires to a surface of a transducer suspension at a plurality of attachment spots, the wires running in a direction substantially parallel to the longitudinal axis of the suspension;

electrically connecting the wires to electrical pads on a transducer slider attached to the suspension;

moving a swipe member in a direction substantially parallel to a lateral axis of the suspension, engaging the wires and bending them down onto the surface of the suspension, wherein the swipe member has two fingers, each of which engage a different portion of the wires.

2. The method of claim 1, wherein the wires are bent at a substantially perpendicular angle at the end of the suspension to attach to the electrical pads on a side of the slider.

3. The method of claim 1, wherein the swipe member engages the wires between an attachment spot and a distal end of the suspension.

4. The method of claim 1, wherein the swipe member is located at an angle in the range of 5° to 85° from a vertical axis.

5. The method of claim 1, wherein the swipe member is made of a flexible material and extends from above the suspension to a location just below the top surface of the suspension.

6. A method of manufacturing a transducer suspension system comprising the steps of:

attaching a plurality of wires to a surface of a transducer suspension at a plurality of attachment spots, the wires running in a direction substantially parallel to the longitudinal axis of the suspension;

electrically connecting the wires to electrical pads on a transducer slider attached to the suspension;

moving a swipe member in a direction substantially parallel to a lateral axis of the suspension, engaging the wires and bending them down onto the surface of the suspension, wherein the swipe member is located at an angle in the range of 5° to 85° from a vertical axis.

7. The method of claim 6, wherein the wires are bent at a substantially perpendicular angle at the end of the suspension to attach to the electrical pads on a side of the slider.

8. The method of claim 6, wherein the swipe member engages the wires between an attachment spot and a distal end of the suspension.

9. The method of claim 6, wherein the swipe member is made of a flexible material and extends from above the suspension to a location just below the top surface of the suspension.

* * * * *